No. 866,846. PATENTED SEPT. 24, 1907.
C. O. DAYTON.
ELECTRIC LOCOMOTIVE CONTROLLER.
APPLICATION FILED OCT. 8, 1906.

WITNESSES:

Charles O. Dayton INVENTOR

By

ATTORNEYS

No. 866,846. PATENTED SEPT. 24, 1907.
C. O. DAYTON.
ELECTRIC LOCOMOTIVE CONTROLLER.
APPLICATION FILED OCT. 8, 1906.

WITNESSES:

Charles O. Dayton INVENTOR

By
ATTORNEYS

No. 866,846. PATENTED SEPT. 24, 1907.
C. O. DAYTON.
ELECTRIC LOCOMOTIVE CONTROLLER.
APPLICATION FILED OCT. 8, 1906.

WITNESSES:

Charles O. Dayton INVENTOR

ATTORNEYS

No. 866,846. PATENTED SEPT. 24, 1907.
C. O. DAYTON.
ELECTRIC LOCOMOTIVE CONTROLLER.
APPLICATION FILED OCT. 8, 1906.

WITNESSES: Charles O. Dayton INVENTOR
By C.A.Snow&Co
ATTORNEYS

No. 866,846. PATENTED SEPT. 24, 1907.
C. O. DAYTON.
ELECTRIC LOCOMOTIVE CONTROLLER.
APPLICATION FILED OCT. 8, 1906.

WITNESSES: Charles O. Dayton, INVENTOR
By
ATTORNEYS

No. 866,846.

PATENTED SEPT. 24, 1907.

C. O. DAYTON.
ELECTRIC LOCOMOTIVE CONTROLLER.
APPLICATION FILED OCT. 8, 1906.

WITNESSES:

Charles O. Dayton INVENTOR

By

ATTORNEYS

No. 866,846. PATENTED SEPT. 24, 1907.
C. O. DAYTON.
ELECTRIC LOCOMOTIVE CONTROLLER.
APPLICATION FILED OCT. 8, 1906.

WITNESSES: Charles O. Dayton, INVENTOR.

By C. A. Snow & Co.
ATTORNEYS

UNITED STATES PATENT OFFICE.

CHARLES O. DAYTON, OF WASHINGTON, IOWA.

ELECTRIC LOCOMOTIVE-CONTROLLER.

No. 866,846.        Specification of Letters Patent.        Patented Sept. 24, 1907.

Application filed October 8, 1906. Serial No. 337,999.

*To all whom it may concern:*

Be it known that I, CHARLES O. DAYTON, a citizen of the United States, residing at Washington, in the county of Washington and State of Iowa, have invented a new and useful Electric Locomotive-Controller, of which the following is a specification.

This invention relates to block signaling systems and locomotive controlling devices, and has for one of its objects to provide a system by which all collisions between railway trains, both head on and rear end, may be prevented.

A further object of the invention is to provide a system in which each train as it passes along the line will automatically register its position on an indicator placed at the central station, the end of the division, or stations along the line, so that the exact position of every train may be made known to the train despatcher or other official.

A still further object of the invention is to provide a system in which warnings will be sounded and trains automatically stopped when they approach within the danger limit.

A still further object of the invention is to provide a system wherein if a car or train is standing on the main line, as at a station, all trains coming in either direction will be stopped automatically at some distance from such car or train.

A still further object of the invention is to provide a system in which if a switch on the main line is moved to open position, an approaching train will be stopped before it can reach the open switch.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings: Fig. 7 is a side elevation of one of the step by step circuit closing drums. Fig. 8 is an end elevation of the same. Fig. 9 is a plan view, and Fig. 10 an end elevation of one of the circuit changing electro-magnets employed.

Similar numerals of reference are employed to indicate corresponding parts throughout the several figures of the drawings.

In carrying out the invention, a division of the railroad is divided into blocks of convenient length, and each block is arranged to contain contacts that are engaged by traveling contacts on the locomotives, so that circuit may be closed through main line wires with a source of energy that is preferably placed at one end of the division, a suitable dynamo or batteries being placed at a convenient point and having wiring connections with all of the contacts in the blocks throughout the length of the division.

The contacts of each block are divided into two classes, one being used for the purpose of operating a signaling or train controlling mechanism on the locomotive, and these contacts being engaged in common by all of the locomotives traveling over the road. A second set or sets of contacts is arranged in each block, there being a single set for each locomotive, and are engaged by the contacts of that locomotive only, but the contacts of any one of the locomotives may set the circuits, so as to give a signal to a following train, or to a train approaching head on.

Figure 1:
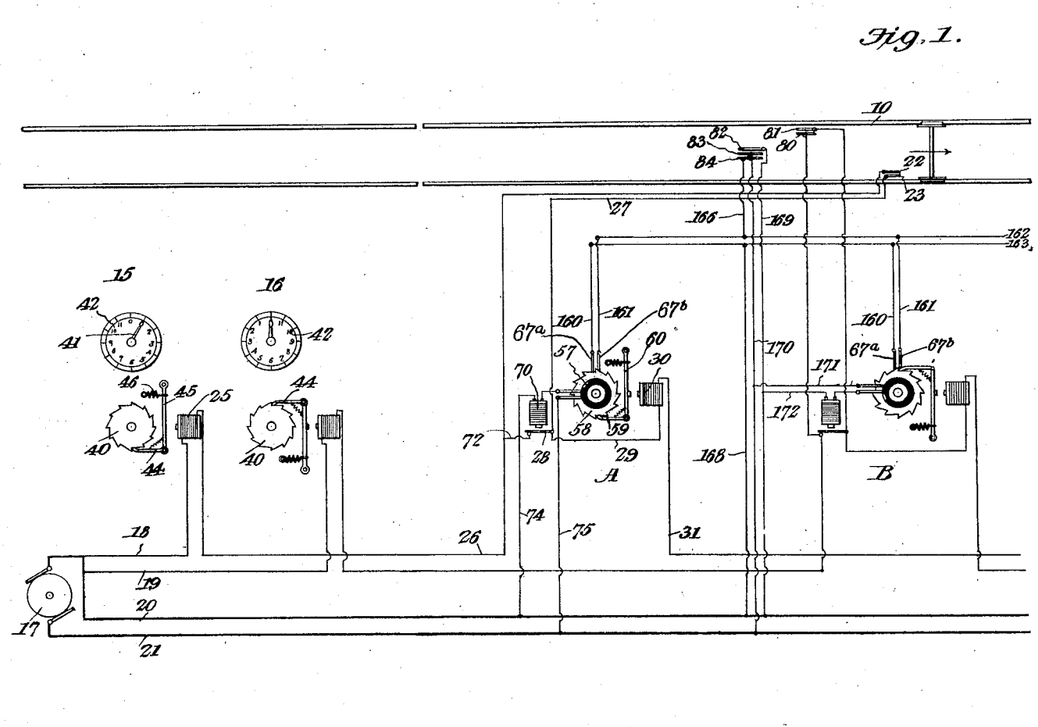
—Figures 1 and 1ª illustrate a system constructed and arranged in accordance with the invention.

In the drawings, referring first to Figs. 1 and 1ª, 10 and 11 designate two separate blocks, the ends of the rails being shown spaced merely to indicate the dividing lines of the blocks. The rails need not be insulated for the most part as only short sections of them are used as conductors, as will hereinafter appear. In each block is arranged a number of step by step circuit controlling devices, of which two sets are shown in the present instance, one set, designated generally as A, being employed in connection with a single train traveling in the direction indicated by the arrow in Fig. 1, and the other set B, being employed in connection with a single train traveling in the opposite direction. If two, three or more trains are to follow each other over the same division, a separate indicating device and circuit closing devices are employed in connection with each train. At the end of the division, say in the train despatchers' office, is arranged an indicating mechanism for each train; one of such indicating mechanisms 15 being employed for each train traveling in the direction indicated at the arrow in Fig. 1, while a second set of indicating mechanims is employed for each train traveling in the reverse direction, so that the train despatcher may ascertain at a glance the position of each train on the division. Arranged at the end of the division or other convenient point, is a source of energy, represented in the present instance as a dynamo 17, and from this lead three outgoing wires 18, 19 and 20, running the full length of the division, and a common return wire 21, also extending the full length of the division.

The stationary contacts for a train running in the direction indicated by the arrow in Fig. 1, and which are used for the purpose of setting the alarm and controlling circuits, and for operating the indicators, are arranged in each block, and are shown in the present instance in the form of contact strips 22—23, 22ª—23ª and 22ᵇ—23ᵇ, all arranged near the lowermost traffic rail of the diagram. The energizing circuit in which these contacts are connected may be traced from the dynamo through the wire 18, to an electro-magnet 25, of the indicator 15, thence by wires 26 to the contact 22, thence through the contacts carried by the locomotive, as hereinafter described, and down to contact 23, to the wire 27, armature 28, wire 29, electro-magnet 30, wire 31, contact 22ª, or contact 22ᵇ across through the locomotive contacts to contact 23ª or 23ᵇ, and thence by wire 32 to electro-magnet 33, wire 34, and so on to the end of the division, passing through all of the electro-magnets of the step by step circuit controlling devices A, and by return wire 21, back to the dynamo. The construction and arrangement of the circuits are such, however, that the cirucit will be closed through all of the electro-magnets, with the exception of the electro-magnet of that block which the locomotive is approaching, so that when said locomotive reaches the contact of that block and engages the same, the circuit will be fully closed through all of the electro-magnets of the circuit controlling devices A, and each of such electro-magnets will operate for the purpose of imparting a step by step movement to said circuit controlling devices, and at the same time the electro-magnet 25 of indicator 15 will, also, be energized, and this indicating mechanism will receive a step by step movement each time the train passes a block, so that the train despatcher or other person at the end of the division can readily ascertain the position of the train.

Each of the indicating mechanisms 15—16 includes a suitable ratchet wheel 40 that is provided with teeth of a number corresponding to the number of blocks, or rather the number of sets of contacts in the entire system, and the ratchet wheel is connected to a suitable hand or pointer 41 arranged to travel over a graduated dial 42. The teeth of the ratchet wheel are engaged by a pawl 44 carried by an armature lever 45 that is disposed within the field of force of the electro-magnet 25, and each time the latter is energized the armature lever will be attracted, and the pawl 44 will be drawn backward into engagement with the next tooth of the ratchet wheel. When the electro-magnet is deënergized, a spring 46 pulls the armature in the opposite direction, and the ratchet wheel is advanced to the extent of a single tooth.

Each of the circuit controlling devices A is of the construction best shown in Figs. 7, 8, 9 and 10. On a suitable base 50 are mounted standards 51, having screws 52 that serve as supports for a drum 53 formed of, or covered with insulating material, and carrying a number of contacts. For the operation of a single train it is only necessary to employ the contacts 55, 56 and 57. The function of these contacts is to keep the train surrounded by an energized circuit, so that it may be warned of trains approaching within two whole blocks ahead or within one block behind, and may also warn the train approaching and the train following. The function of the contact 55 as will hereinafter appear, is to close the circuit of the electro-magnet which operates the armature 28. The function of the contact 56 is to set the circuit for two complete blocks ahead of each train, so that any train coming in the opposite direction and entering these blocks will be stopped, and the train setting signals will also be stopped. The function of the contact strip 57 is to set the circuits for the warning of a following train in a single block to the rear, and if a train enters the block to the rear, both trains will be warned. It will here be noted that the contact 56 is approximately twice the width of the contact 57, so that it will remain in operative position during two step by step movements of the drum, while the contact 57 will remain in operative position during but a single step movement of the drum.

At the center of the insulating drum is mounted a ratchet wheel 58, the teeth of which are engaged by a pawl 59 that is carried by an armature lever 60. This lever has an armature 61 arranged within the field of force of an electro-magnet 30, and this return movement from the pole of the magnet is accomplished by a spring 62. The outward movement of the armature is under the control of a set screw 63 with which the armature lever engages. When the armature is attracted, the pawl 59 slides over the ratchet wheel to engage the next tooth and when the armature is released, the spring 62 pulls the pawl forward to advance the ratchet wheel, and the drum a single step.

Extending from the base plate are standards 65 which carry contacts in the form of spring arms arranged to bear on the periphery of the drum. Two of these contacts 65ª and 65ᵇ are arranged to bear on the contact 55. Another pair of contacts 66ª and 66ᵇ are arranged to engage the contact 56. A third pair of contacts 67ª and 67ᵇ are arranged to engage the contact 57.

The several drum contacts of the respective circuit controlling devices are arranged at successively advanced points in the different blocks, that is to say, the contact 55 of the first block will at the starting of operations be in engagement with the two contacts 65ª and 65ᵇ while the contacts of the second block will be one step to the rear out of engagement with the contacts 65ª and 65ᵇ, and in readiness to contact with the same as soon as the drums have received the first step by step movement. The contact of the third block will be two steps to the rear and the contact of the fourth block, three steps to the rear, so that as the drums simultaneously receive step by step movements, the contact of the successive blocks will be successively moved into engagement for the purpose of controlling the circuits. In similar manner all of the drum contacts are arranged in step by step order, those of one block being one step behind those of the preceding block, and one step in advance of those of an advanced block, and while the contacts 55 and 57 operate only during one step movement of the drums, the contact 56 remains in operation during all consecutive steps.

At a point adjacent to each of the drums is an electro-magnet 70, and below the electro-magnet is the armature 28 previously referred to and to which the wires 27 and 29 are electrically connected. The free end of the armature is normally held in engagement with a contact 71, that is connected by a branch wire 72 to the main wire 26.

If the circuits are now traced with the various parts in the positions shown in Figs. 1 and 1ª, it will be seen that the locomotive has passed beyond the contacts 22 and 23 of block 10, and when this has been accomplished, all of the circuit controlling drums have been advanced a single step, so that the contact 55 of the first drum is moved out of engagement with the spring contacts 65ª and 65ᵇ. As these contacts initially rested on the contact 55, the first movement broke a circuit which has been closed from wire 20 through wire 74, electro-magnet 70, contacts 55, 65ª, 65ᵇ to a wire 75 to the common return wire 21. This has deënergized the electro-magnet 70, and the armature 28 thereupon falls into engagement with the contact 71, closing a circuit from wire 72 through the armature 28, and wire 29 to the electro-magnet 30. This initial step movement, however, has brought the contact 55 of the next block, shown in Fig. 1ª, into engagement with the contacts 67ª and 67ᵇ of that block, and a circuit has been closed through the electro magnet 70 of the second block, resulting in attracting the armature and breaking the circuit through the said armature, the circuit being then open at the contacts 22ª and 23ª, 22ᵇ and 23ᵇ and the circuit is open only at these points throughout the entire division, all of the electro-magnets 70 being deënergized with the exception of the electro-magnet of the second block which the train is then approaching. It will be seen, therefore, that it is only necessary for the circuit to be closed at this one point, namely, the point which the locomotive is approaching, in order to energize all of the electro-magnets by which the step by step movements are accomplished. Each time the circuit is closed by passage of the train over the track contacts, the electro-magnet 25 of the indicating device at the train despatcher's end of the line is energized and the indicator is turned to the extent of a single tooth, so that the train despatcher, by watching the pointer, may ascertain the exact location of the train.

The circuit controlling devices A and the contacts arranged near the lowermost traffic rail in the diagram are arranged to operate in connection with contacts carried by a train traveling in the direction indicated by the arrow in Fig. 1. The circuit controlling devices B and the contacts 80—81 near the upper traffic rail are intended to be used in connection with the same or another train traveling in the opposite direction, and if there are two trains traveling in each direction, there will be separate road bed contacts for each of them, and separate circuit controlling devices and separate indicators at the end of the division or train despatcher's office. In addition to these contacts there are, also, three contacts 82, 83 and 84 that are arranged mid-way between the traffic rails, there being one set in each block, and these are common to all trains, and if any locomotive passes over one of these sets of central contacts going toward head end or rear end of another train while it is in an adjacent block, both trains will receive a warning signal, and one or both of them may be automatically stopped by moving the throttle lever and applying the air brakes.

On each locomotive are brackets 90 having guides for the support of vertically movable boxes 91 that are held down by compression springs 92. These boxes form bearings for the reduced end portions of a transversely extending bar 93 which is held in a central position by an arm 94, and suitable springs 95, the arrangement being such as to maintain the arm 94 in an approximately vertical position and permitting its rotative movement to a slight extent in either direction.

Extending through the bar 93 are contacts 96, 97, 98, 99, 100, 101 and 102, all of which are preferably formed of some elastic material, such, for instance, as spring steel, and all of these contacts are insulated from each other, and from the carrying bar 93.

For the movement of the trains traveling in the direction indicated by the arrow in Fig. 1, the two contacts 96 and 97 operate in combination with the road-bed contacts 22 and 23, and the circuit which has been previously traced from wire 26 to contact 22, is completed through contact 97, wire 104, to a switch point 105, switch 106, switch point 107, wire 108, and return to contact 96, and from thence to the contact 23, thus completing the circuit each time the locomotive travels over one set of contacts. Should the locomotive be running backward for any reason, the switch is thrown over to engage contacts 109 and 110, and the contacts 98 and 99 are then brought into play and coöperate with the road-bed contacts 81 and 80 in operating the circuit controlling devices B.

Figure 6:
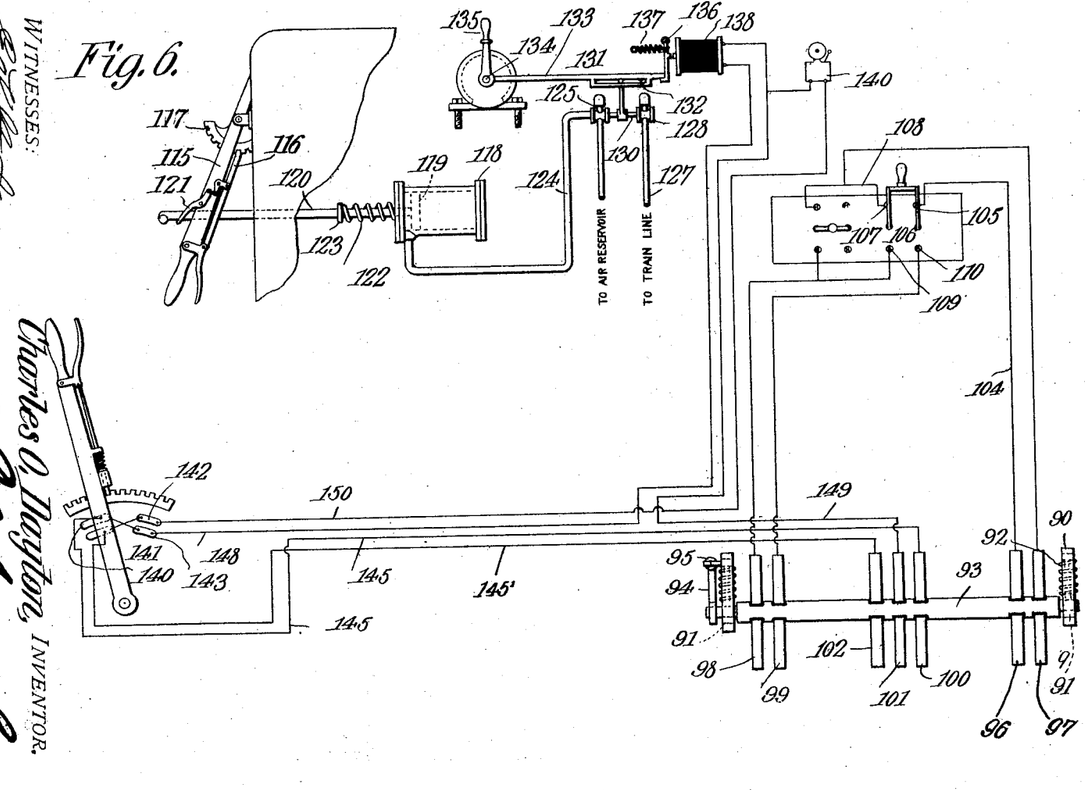
Fig. 6 is a diagram of the wiring connections and mechanism on each locomotive.
Figures 7, 8, 9, 10:
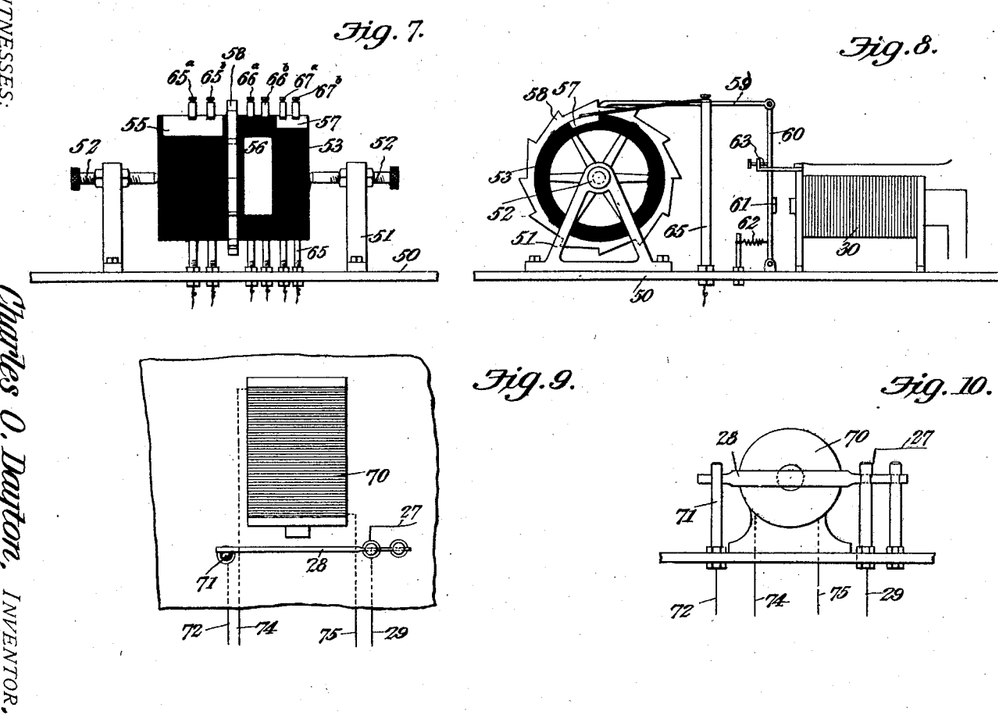

In the locomotive cab is arranged a throttle lever 115 having the usual latch bolt 116, movable over a quadrant 117. At a point adjacent to the throttle lever is a fluid pressure cylinder 118, containing a piston 119 from which leads a rod 120 having an arm arranged to engage the bell crank lever 121 that is pivoted to the throttle lever, and the rod is normally held in the position shown in Fig. 6 by a helical compression spring 122 that extends between the head of the cylinder and a disk 123 on the rod. The cylinder is connected by a pipe 124 to the main air reservoir of the locomotive brake system or other source of fluid pressure supply, and in said pipe is a normally closed valve 125. If this valve is opened and fluid under pressure is allowed to pass from the reservoir to the cylinder 118, the piston 119 will be moved against the stress of the spring 122, and the rod 120 will operate on the lever 121, moving the latch bolt 116 to release position, and then on further movement will pull the throttle lever over for the purpose of cutting off the flow of the steam and stopping the engine.

When the lever 135 is in normal position, valve 125 is closed from air reservoir, but is open to allow the air to drain out of the cylinder by force of spring 122.

Leading from the train pipe of the brake system is a pipe 127, having a discharge valve 128 that is normally closed. If this valve is turned to open position, the air is allowed to flow from the train pipe, reducing the pressure and resulting in the application of the brakes in the usual manner.

The two valves 125 and 128 are connected by a stem 130, and from the stem extends a rocker arm 131 the end of which enters a slot 132 in an arm 133 that is carried by the stem of a retarding device 134 which may be of the type ordinarily employed as door checks, its function being merely to retard the opening movement of the valves, so as to avoid too sudden operation of the reversing and the air brake mechanisms. The retarding device is provided with a suitable handled lever 135 in order that the engineer may conveniently restore it to initial position after each operation. The arm 133 is normally held from movement by an armature lever 136, that is held in engaging position by a spring 137. This armature lever carries an armature that is disposed within the field of force of an electro-magnet 138, and when the latter is energized, the armature is attracted and arm 133 is released for the purpose of opening both valves and permitting the operation of the throttle lever and setting of the air brakes. In addition to this mechanism an alarm 140 is placed in the cab of each engine, this alarm being shown in the present instance in the form of a small electric bell, although it may be in the form of a lamp or other visual signal.

To the rear of the reversing lever 115 is a pole changing switch, including four contact plates, 140, 141, 142, and 143, the plates 141 and 142 being connected to each other, and the plates 140 and 143 being, also, connected. To the reversing lever runs two wires 145 and 145', which lead, respectively, from the contacts 100 and 102. The two wires 145 and 145' are connected to and held by a reversing lever, while the contact plates 140—141 and 142—143 are stationary and cross-connected as described. When the lever is swung to the right, the terminals of the two conductors 145—145' make contact respectively with the contact plates 142—143, and when this lever is at the left or in the position shown in Fig. 6, these two conductors make contact with the plates 140—141. It will therefore be seen that the lever and plates constitute a simple and well-known form of pole changing switch.

If the engine passes over the three road-bed contacts in any block in which the circuit has been properly adjusted by a train approaching in Fig. 1 direction, a circuit will be established from the main line wires along the track in the manner hereinafter described to contact 100, wire 145, reversing lever, contact plate 143, engaging the lever, wire 148, electro-magnet 138 and wire 149 back to the central traveling contact 101. This will energize the magnet 138 and the throttle lever will be moved over and the air brakes will be set. Where the engineer is to be notified of the fact that there is a train in the block behind him, the circuit is closed in the manner hereinafter described through contact 102, wire 145', reversing lever, contact plate 142, wire 150, to the bell, thence by wire 149 to the contact 101. When the lever is moved over into engagement with the contact plates 142 and 143, these circuits will be reversed, contact 100 then acting in the bell circuit and contact 102 connecting with the circuit of the electro-magnet 138.

In connecting the track contacts 82, 83, 84 with the source of energy, the circuit controlling drums 53 are used and the contact plates 56, 57 of these drums are arranged in a manner similar to the contact plates 55, that is to say, they are disposed at different points in the successive blocks, so that while the contact of the first drum is in circuit closing position when the train starts at the end of the division, the contacts of the second drum will be one step to the rear, and the contacts of the third drum will be two steps to the rear, said contacts being successively brought to circuit closing position as the train advances.

Leading from the contacts $67^a$ and $67^b$ of the circuit controlling drum A of each block are wires 160 and 161, and these are connected respectively to cross wires 162 and 163. In the first block 10 the wire 162 is connected by a wire 166 to the contact 84 and when the contact plate 57 is in engagement with the contacts $67^a$ and $67^b$ a circuit may be traced from the feeder wire 20 through a wire 168 to cross wire 163, wire 160, contact $67^a$, contact plate 57, contact $67^b$, wire 161, cross wire 162, track contact 84, through the engine circuit and down to contact 83 and then by wire 170 to the common return wire 21. As a result the train controlling contacts 83 and 84, Fig. 1 of block No. 10 are connected in circuit in such a manner that if a train advances in the same direction as that indicated in Fig. 1 the locomotive circuit will be closed for the purpose of moving throttle and applying air brakes. As indicated on the diagram in Fig. 1, however, the engine has passed beyond these track contacts, and as a result the contact plates 56 of the second and the third blocks have been so adjusted that they engage with their respective contacts $66^a$ and $66^b$, and as a result the train controlling contacts 82 and 83 of the second and third blocks, the latter not being shown, are connected in circuit in such manner that if a train advances in a direction the opposite of that indicated in Fig. 1 in block three or in block two, the locomotive circuit will be closed for the purpose of moving the throttle lever and applying the air brakes.

The reason for the completion of the circuits to the controlling contacts 82 and 83 in block 11 of Fig. $1^a$ is that a train advancing toward the train shown in Fig. 1 carries its contact 100 on the right of the locomotive, or just the opposite side from the location of the contacts of the train shown in Fig. 1. It will be seen that if circuits are completed to contacts 83 and 84 in Fig. $1^a$ it would merely ring the bell instead of shutting off steam and applying air for the engine advancing on block ten. This train must be stopped or a rear end collision will occur.

For a clearer understanding of the invention, it may be supposed that the contact carrying drums are being revolved. The first of the contacts 56 will engage brushes $66^a$ and $66^b$ to complete the circuit to the track contact 82. In this case the locomotive is supposed to be two blocks to the left of the contact drum in question. When the locomotive arrives at the next block, or at one block to the left, about three-fourths of the contact 56 will have been moved under the contact brush. As soon as the locomotive reaches and passes the contacts $22^a$ and $23^a$ of this block, the brushes $66^a$ and $66^b$ will fall on insulating material. The brushes $67^a$ and $67^b$ are also on insulation, so that all circuits are broken to contacts 82, 83 and 84 so far as this locomotive is concerned. This enables the locomotive to pass the contacts 82, 83 and 84 without actuating this mechanism by its own circuits. It now engages contacts $22^a$ and $22^b$ and brushes $67^a$ and $67^b$ now rest on contact 57, and this completes the circuit to the contact 84. Now that the locomotive has passed, any train coming behind it while it is in this block will be stopped. To return to the starting point, contact 56 completes the circuit to contact 82 in the center of the track ahead of it, and contact 57 completes the circuit to contact 84 behind it, the contact 83 being the common return for both, and being situated exactly mid-way between the two rails. The circuits are so arranged that all trains are stopped that are facing each other as soon as they arrive in surrounding blocks, and will stop any train that is approaching too close from behind, but will not affect one locomotive that is running away from another, other than ringing the bell on the locomotive in advance.

Figure 4:
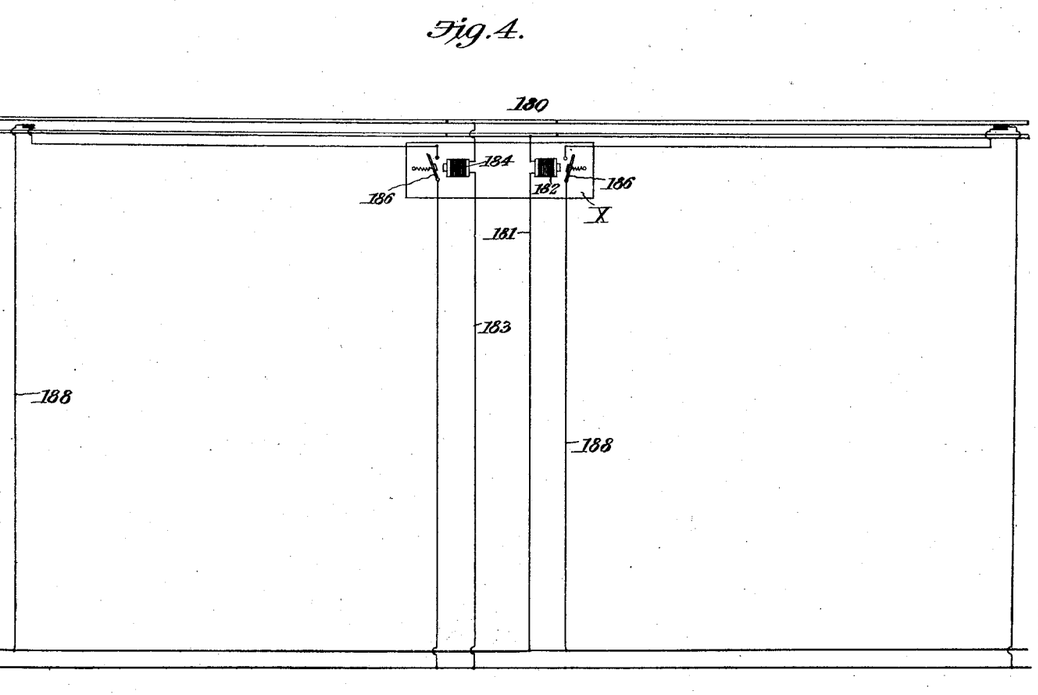
Fig. 4 is a diagram showing the connections for adjusting the circuits, so that when a train or car is standing at a station, approaching trains from either direction will be stopped.
Figure 5:
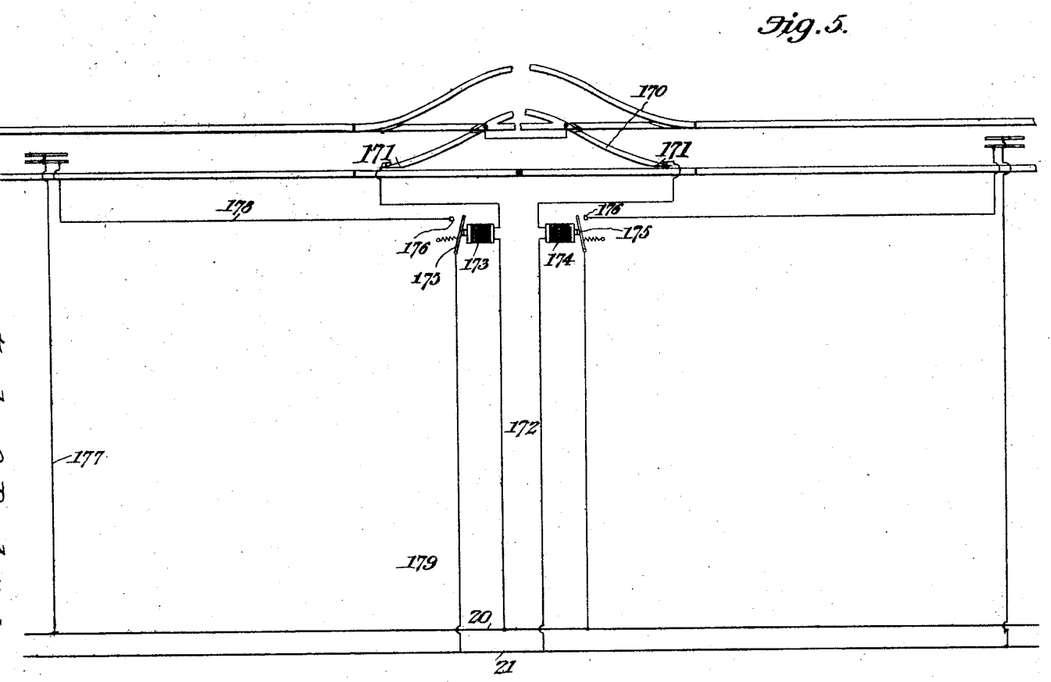
Fig. 5 is a similar view, showing the arrangement for stopping trains which are approaching an open switch.

To avoid danger of accident from an open switch on the main line, contacts of the train controlling series may be placed at some distance beyond a switch or siding, as indicated, for instance in Fig. 5, wherein 170 designates a siding having two switch points 171, both connected in a closed circuit 172, when the switch points are closed, that is, they are in position to permit the siding to be used. The circuit then leads from the wire 20 to an electro magnet 173 to the track, then through both switch points and again to the track, and through an electro-magnet 174 and return to wire 21. So long as the switch points are closed, the electro-magnets will remain energized, and their armatures 175 attracted. If the switch point is opened so that the siding is closed to traffic, the circuit will be broken, the magnets deënergized, and the armatures moved into engagement with contacts 176, so that circuits will be established from wire 20 through the wire 177, to the center contact of the train controlling series, and one of the outer contacts through wire 178, armatures 176, wire 179, to return wire 21. The circuit connections are such that when the siding is open to traffic the train-controlling circuit will be energized when the approaching train passes over the contacts and the train will be stopped. In similar manner the apparatus may be used for stopping trains which are advancing toward a section of the track where a train is already standing. In Fig. 4 there is shown a station $x$ in front of which is a short section of track 180 that is insulated from the remaining track. The two wires of this track are connected in a circuit which leads from one track through a wire 181 and electro-magnet 182 to wire 20, while the other track is connected by a wire 183 in circuit with an electro-magnet 184 to the return wire 21. Arranged adjacent to these electro-magnets are armatures 186 which may be moved to close circuits 188 leading to the train controlling contacts at opposite sides of the station. When a train passes on to the section 180 of the track, the circuit is closed through the wheels and axles of the train, and both electro-magnets 182 and 184 are energized, breaking their armatures and closing circuits which lead to the train controlling contacts in the center of the track at some distance from the station, and any train which passes these contacts will be stopped through the operation of the mechanism previously described.

Figure 2:
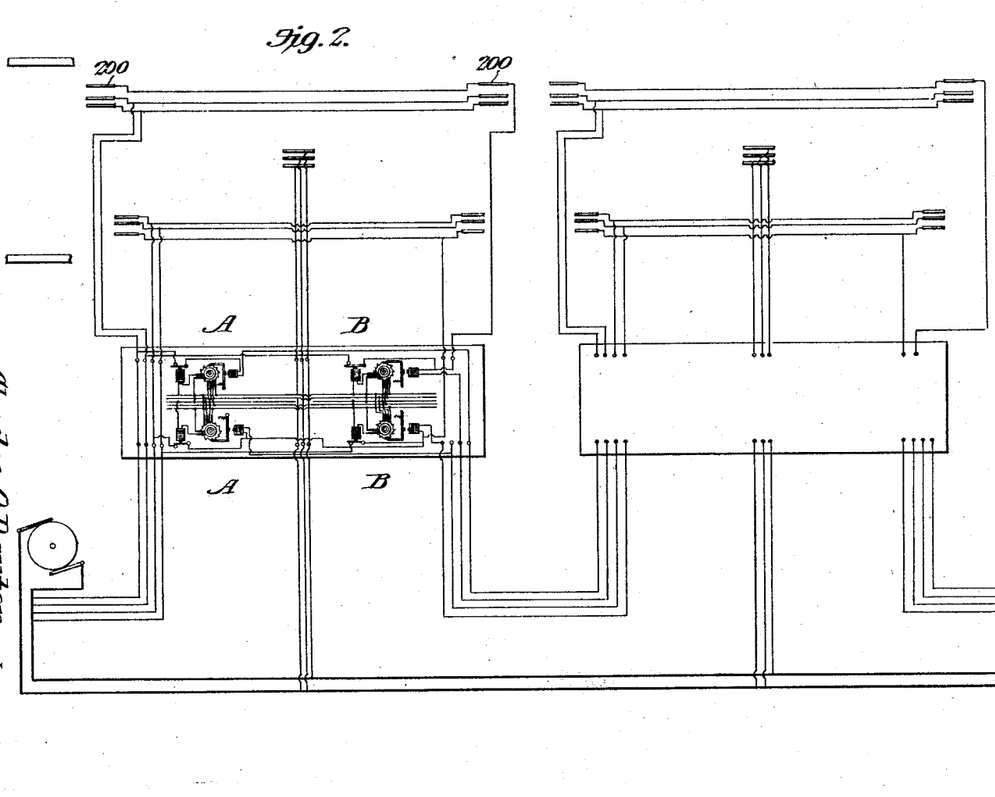
Fig. 2 is a diagram showing the invention as applied for use in connection with four trains traveling on a single track, two in one direction and two in the opposite direction.
Figure 3:
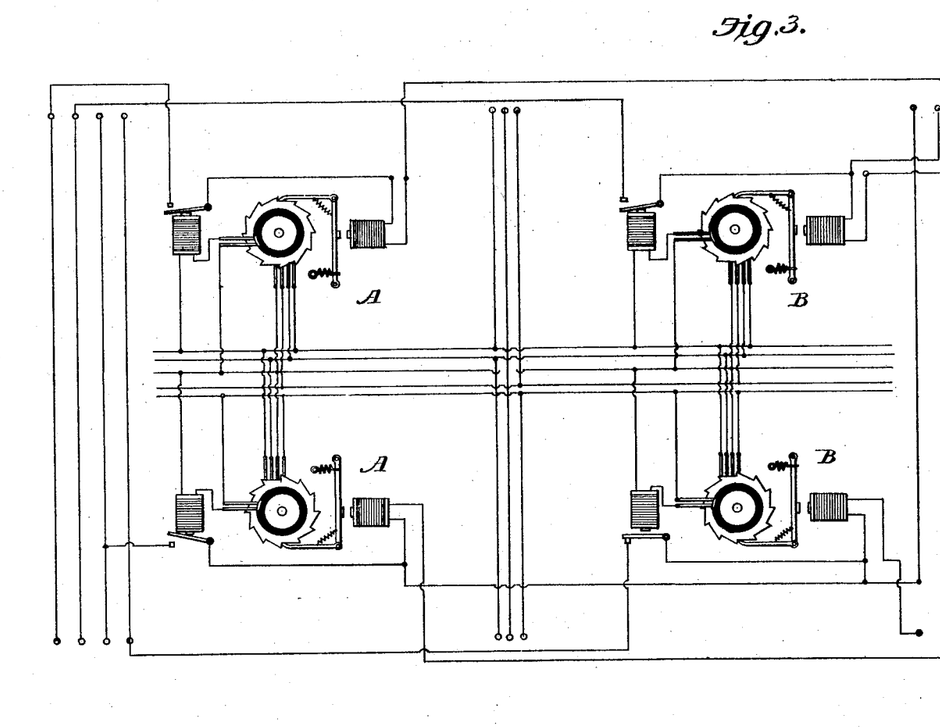
Fig. 3 is a view of the station mechanism, illustrated in Fig. 2, and drawn to an enlarged scale.

In the construction and arrangement shown in Figs. 2 and 3, the contacts are for the purpose of controlling four trains, two passing in each direction, and in this instance there are two sets of circuit controlling devices A and two sets of circuit controlling devices B, the wiring connections being similar to that already described, with the exception that instead of using two separate contacts for each train, only three contacts are used, one set 200 being employed as a common return for both. The wiring connections are otherwise the same, and the arrangement of the circuits may be adjacent to the circuit controlling devices, as illustrated in Fig. 3 on an enlarged scale.

With an apparatus constructed in accordance with this invention, it will be possible to avoid all collisions, both rear and head end; to prevent accident through a misplaced switch; to prevent accidental collision with a train standing at a station or other point, and to indicate at the train despatcher's office or at any other desired point or points in the system.

I claim:—

1. In electric-signaling and safety systems for railways, an electro-magnetically actuated indicator, a circuit extending therefrom and including a series of road bed contacts, traveling contacts arranged to engage the road-bed contacts, and means for maintaining the circuit closed around all of the contacts except that set which the train is approaching.

2. In electric signaling and safety systems for railways, an indicator, an electro-magnet for actuating the same, a circuit extending throughout the length of the road and provided with sets of contacts normally spaced from each other, the sets of contacts being disposed at intervals, train carried contacts arranged to engage the road bed contacts to close the circuit of the electro-magnet, and electro-magnetically actuated means for keeping the circuit open only at that set of contacts which the train is approaching.

3. In electric railway signaling and safety systems, traffic rails divided into blocks, road-bed contacts arranged in each block, train carried contacts arranged to engage the road bed contacts, an electro-magnetically actuated indicator, a plurality of electro-magnetically actuated circuit controllers of which there is one in each block, an energized circuit extending throughout the length of all of the blocks, and means under the joint control of the train carried contacts and the circuit controllers for maintaining the circuit closed except at that set of contacts which the train is approaching.

4. In electric signaling and safety systems for railways, traffic rails divided into blocks, a set of road bed contacts in each block, an indicator, an electro-magnet for actuating the same, an energized circuit connected to the indicator and extending throughout the length of all of the blocks, and means for maintaining the circuit closed in every block except that one which the train is approaching.

5. In electric signaling and safety systems for railways, traffic rails divided into blocks, road bed contacts arranged in sets, there being one set in each block, an energized circuit extending throughout the length of all of the blocks, an electro-magnetically actuated means arranged in each block for rendering the contacts active terminals of the system and shunting the circuit in advance of such contacts, and an electro-magnetically operated indicator connected in the circuit.

6. In electric signaling and safety systems for railways, traffic rails divided into blocks, a set of road bed contacts arranged in each block, an energized circuit extending throughout the length of all of the blocks, circuit controllers arranged in each block for determining the shunting of the circuits in advance of the contacts, train carried contacts arranged to engage the road bed contacts, and an electro-magnetically actuated indicator connected in the circuit.

7. In railway signaling and safety systems, traffic rails divided into blocks, a pair of road bed contacts arranged in each block, a step by step circuit controller arranged in each block, and controlling the circuit of an adjacent block, an energized circuit extending throughout the length of all of the blocks, an electro-magnetically actuated indicator connected in said circuit, and train carried contacts for engaging the road-bed contacts.

8. In an electric railway signaling and safety system, traffic rails divided into blocks, a pair of road bed contacts arranged in each block, electro-magnetically actuated circuit controllers arranged in each block, and controlling the circuit of the contacts of an adjacent block, an energized circuit extending throughout the length of all of the blocks, an electro-magnetically actuated indicator connected in the circuit, and train carried contacts for engaging the road bed contacts.

9. An indicating mechanism for railway systems, comprising an indicator arranged at a suitable point on the system, an electro-magnet for actuating said indicator, a plurality of sets of contacts arranged at different points on the road bed, an energizing circuit extending through the electro-magnet, electro-magnetically actuated means for rendering the successive contacts the active terminals of the circuit and shunting the circuit around the remaining contacts, and train carried contacts for engaging and closing the circuit at the successive road bed contacts.

10. In block signaling and safety systems for railways, a pair of sets of road bed contacts arranged in each block, a pair of sets of train carried contacts arranged to engage the road bed contacts, an energized circuit entending throughout the length of all of the blocks, circuit controlling devices in each block, the circuit controlling devices being operatively connected between the energized circuit and the first set of contacts, and each circuit controlling device serving to control the circuit of the second set of contacts belonging to the next adjacent block, and a signaling or safety means carried by the train and connected to the second set of train carried contacts.

In testimony that I claim the foregoing as my own, I have hereto affixed my signature in the presence of two witnesses.

CHARLES O. DAYTON.

Witnesses:
EDWARD C. EICHER,
NELLIE L. TRIPP.